Patented Jan. 6, 1931

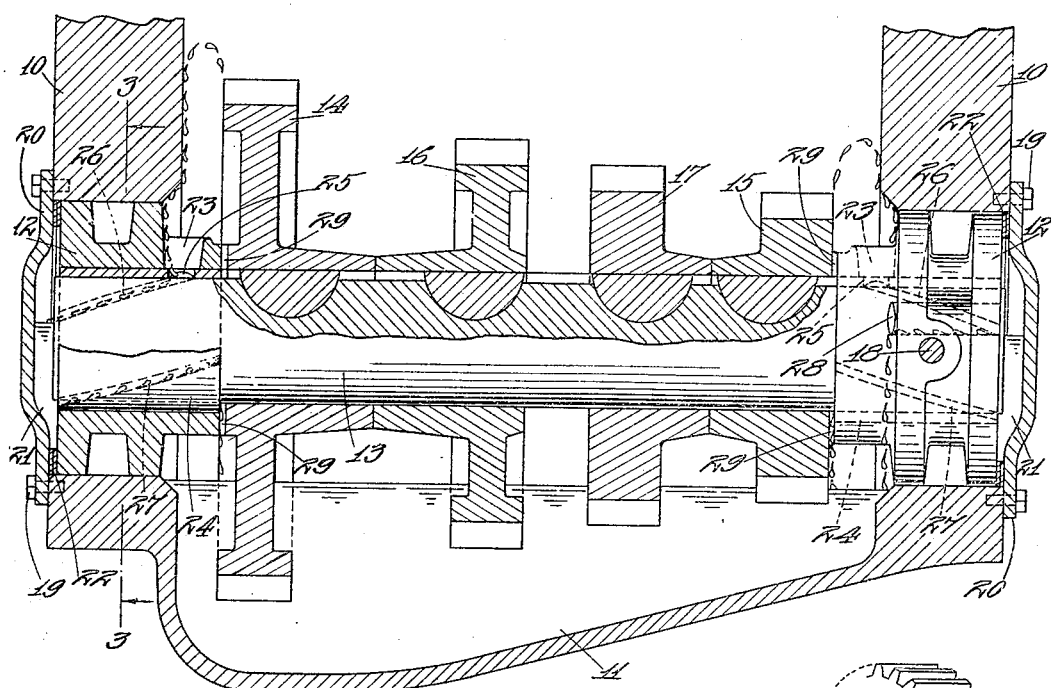
Jan. 6, 1931. S. I. FEKETE ET AL 1,787,428
MEANS FOR LUBRICATING MOTOR VEHICLE TRANSMISSION AND THE LIKE
Filed March 16, 1925

1,787,428

UNITED STATES PATENT OFFICE

STEPHEN I. FEKETE AND STUART G. BAITS, OF DETROIT, MICHIGAN, ASSIGNORS TO HUDSON MOTOR CAR COMPANY, OF DETROIT, MICHIGAN, A CORPORATION OF MICHIGAN

MEANS FOR LUBRICATING MOTOR-VEHICLE TRANSMISSION AND THE LIKE

Application filed March 16, 1925. Serial No. 15,781.

This invention relates to lubricating means for the shaft bearings of gear assemblies and especially, although not exclusively, to means for lubricating the countershaft bearings of motor vehicle transmissions. The invention has for its object to provide means for producing a continuous flow of fresh, cool oil through the shaft bearings proportional to the speed of rotation, said flow continuing so long as the gears are in rotation with their lower edges dipping in oil contained in the usual oil reservoir and ceasing when the rotation of the gears is discontinued.

The more particular objects of the invention, together with means whereby the same may be carried into effect, will best be understood from the following description of a preferred embodiment thereof illustrated in the accompanying drawings. It will be understood, however, that the particular construction described and shown has been chosen for illustrative purposes merely, and that the invention, as defined by the claims hereunto appended, may be otherwise embodied without departure from its spirit and scope.

In the drawings:

Fig. 1 is a longitudinal vertical section, taken substantially through the axis of the countershaft, of the lower part of a motor vehicle transmission, illustrating the application of the invention to the bearings for said countershaft.

Fig. 2 is an inner end elevation of one of the countershaft bearings.

Fig. 3 is a section taken substantially on the line 3—3, Fig. 1.

Fig. 4 is a perspective view of one of the gears.

Fig. 5 is a plan view of one of the bearing bushings.

The invention is herein shown as embodied in a motor vehicle transmission whose casing 10 is formed at the bottom with a sump constituting a reservoir for oil or other lubricant, said casing having bearings 12 in which is journalled a countershaft 13 upon which is keyed a series of co-axial gears including end gears 14 and 15 and intermediate gears 16 and 17, the lower edges of said gears dipping in the lubricant in the reservoir 11, whereby their faces are suitably lubricated. The bearings 12 are seated in openings in the end walls of the casing 10 and are held against rotation therein by means of one or more locking screws 18 (see Fig. 3) which pass through the wall of the casing and engage suitably disposed sockets or recesses in the bearings. Secured to the outer faces of the walls of the casing 10, as by means of cap screws 19, are cover plates 20 which enclose the outer ends of said bearings and shafts and form beyond said outer ends lubricant compartments 21, adjusting shims 22 being preferably interposed between said cover plates and the outer ends of the bearings 12. The lubricant compartments 21 are closed at the bottom so as to permit the accumulation of lubricant therein. At its upper side adjacent its inner end, each bearing 12 is formed with an opening 23 extending therethrough and having an enlarged or flaring mouth forming a pocket disposed substantially in vertical alinement with the inner face of the adjacent wall of the casing 10 so as to receive lubricant running down said face. Interposed between the ends of the shaft 13 and bearings 12, and forming in effect parts of the latter, are bushings 24 each having in its wall adjacent the inner end thereof an opening 25 in alinement with the opening 23, each of said bushings being further formed on its interior surface with oppositely inclined spiral grooves 26 and 27, the latter extending throughout the length of the bushing, and the former extending from the opening 25 to the compartment 21. Each bearing 12 has extending therethrough above the level of the bottom of the bearing one or more combined overflow and breather holes 28 which serve to vent the compartments 21 and permit the overflow of lubricant therefrom into the reservoir 11, thereby maintaining the level of the oil in said compartments. The end gears 14 and 15 of the series are located adjacent the inner ends of the bearings 12, which are extended substantially into engagement with the outer faces of said gears, and said outer faces are formed with radial grooves 29 which are brought successively into communication with the inner ends of the grooves 27 in the bushings 24 as said gears rotate with the shaft 13. The extended ends of the bearings act, in conjunction with the shims 22, as thrust faces to locate the gears longitudinally on the shaft.

In operation, rotation of the gears with their lower edges dipping into the lubricant in the reservoir 11 causes said lubricant to be thrown or splashed upon the walls of the casing 10. As said lubricant runs down said walls a portion thereof finds its way into the pockets formed by the enlarged or flaring mouths of the openings 23 and passes through said openings, as well as through the openings 25 in the bushings 24 into the grooves 26. The inclination of said grooves 26, with respect to the rotation of the shaft 13, is such as to cause the lubricant to flow along said grooves to the extreme outer ends of the bearings into the compartments 21, causing the latter to be filled with lubricant up to the level of the lowermost positions of the outer ends of the grooves 27, thereby maintaining a body of lubricant in each of said compartments. The inclination of the latter grooves being opposite to that of grooves 26, the lubricant is caused to flow inwardly along said grooves to the inner ends of the bearings. At these points the radial grooves 29 in the gears 14 and 15 cause the lubricant to be drawn by centrifugal action from the inner ends of the grooves 27 and returned to the reservoir.

It will thus be seen that an outward and inward circulation of lubricant is maintained over the bearing surfaces between the bearings and the shaft substantially from end to end of each bearing so long as said shaft is in rotation, the rate of flow of the lubricant being proportional to the speed of rotation. The breather holes 28 in the bearings serve to relieve any air pressure which may tend to accumulate in the compartments 21 and allow said compartments to overflow into the reservoir should the outward flow of oil for any reason exceed the inward flow thereof. On the other hand, said compartments insure the accumulation and maintenance of a sufficient body of lubricant at the outer ends of the bearings to supply the inward flow and thereby keep said bearings flooded.

Having thus described our invention, we claim:

1. In a motor vehicle transmission or the like, a casing having a reservoir for lubricant, a bearing, and a lubricant compartment beyond said bearing, a shaft journalled in said bearing, a gear on said shaft dipping in the lubricant in said reservoir, and means for causing lubricant thrown by said gear upon the wall of said casing to flow through said bearing to said compartment and from said compartment to said reservoir, said bearing having holes therethrough to vent said compartment and permit overflow of oil therefrom.

2. In a motor vehicle transmission or the like, a casing having a reservoir for lubricant, a bearing, and a lubricant compartment beyond said bearing, a shaft journalled in said bearing, a gear on said shaft adjacent said bearing, said gear dipping in the lubricant in said reservoir, and means for causing lubricant thrown by said gear upon the wall of said casing to flow through said bearing toward and from said compartment, said gear having in its face adjacent said bearing radial grooves for withdrawing said lubricant from said bearing and returning the same to said reservoir.

3. In a motor vehicle transmission and the like, a casing having a bearing, a reservoir for lubricant at the inner side of said bearing, and a lubricant compartment at the outer side of said bearing, a shaft journalled in said bearing, a gear on said shaft adjacent the inner side of said bearing, said gear dipping in the lubricant in said reservoir, said bearing having an opening arranged to receive from the wall of said casing lubricant thrown thereon by said gear, and means, including oppositely inclined spiral grooves in one of said parts, for causing said lubricant to flow between said shaft and bearing from said opening to said compartment and from said compartment to the inner side of said bearing, said gear having in its face adjacent said bearing radial grooves for returning the lubricant from said bearing to said reservoir.

In testimony whereof we affix our signatures.

STEPHEN I. FEKETE.
STUART G. BAITS.